(12) United States Patent
Chen et al.

(10) Patent No.: US 11,731,314 B2
(45) Date of Patent: Aug. 22, 2023

(54) FIBER PRE-DISPERSING DEVICE FOR FIBER REINFORCED CONCRETE

(71) Applicant: Qingdao University of Technology, Qingdao (CN)

(72) Inventors: Jianqiang Chen, Qingdao (CN); Yutian Wang, Qingdao (CN); Wei Zhou, Qingdao (CN); Enbo Fan, Qingdao (CN); Taiyan Liu, Qingdao (CN); Lingbo Meng, Qingdao (CN); Xun Wang, Qingdao (CN); Zhen Xu, Qingdao (CN); Junwei Liu, Qingdao (CN); Xiaoyu Bai, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 0 days.

(21) Appl. No.: 18/079,340

(22) Filed: Dec. 12, 2022

(65) Prior Publication Data
US 2023/0234260 A1    Jul. 27, 2023

(30) Foreign Application Priority Data
Jan. 22, 2022    (CN) .......................... 202210075362.1

(51) Int. Cl.
*B28C 5/40*    (2006.01)
*E04G 21/02*    (2006.01)

(52) U.S. Cl.
CPC ................ *B28C 5/402* (2013.01); *B28C 5/40* (2013.01); *E04G 21/02* (2013.01)

(58) Field of Classification Search
CPC ................ B65H 43/06; B65H 2553/20; B65H 2301/41524; E04C 5/073; B28C 5/40; B28C 5/402; B28C 5/404; E04G 21/02
(Continued)

(56) References Cited

U.S. PATENT DOCUMENTS 3,932,980 A  *  1/1976  Mizutani ................... B29B 7/60
                                                     53/111 R
4,023,779 A  *  5/1977  Beloy ....................... B28C 5/40
                                                      366/20

(Continued)

FOREIGN PATENT DOCUMENTS

GB             2098497 A  *  11/1982  ........... B28C 5/1246

*Primary Examiner* — Charles Cooley
(74) *Attorney, Agent, or Firm* — WPAT, P.C

(57) ABSTRACT

A fiber pre-dispersing device for fiber reinforced concrete, comprising: a dispersing chamber, a feed inlet is installed on the upper side of a dispersing chamber, a hopper is installed in the feed inlet, a first dispersing device is installed in the dispersing chamber, a discharge outlet is installed at the bottom of the dispersing chamber, and connected with a second dispersing device, grooves are arranged at both sides of dispersing chamber, supporting legs are installed in the grooves. According to the invention, the device has a first dispersing device and a second dispersing device, and the dispersing blocks in the first dispersing device cooperates with the dispersing gears of the roller to preliminarily disperse and stir the fiber raw materials, a second dispersing device; dispersing the preliminary dispersed fiber raw materials, in order to control the fineness of pre-dispersed fiber raw materials, oil cylinders arranged on both sides can push their respective grinding cylinders to adjust the dispersion, thus improving both fiber dispersion effect and using the effect in concrete works.

10 Claims, 5 Drawing Sheets

(58) Field of Classification Search
USPC .......................................................... 222/129
See application file for complete search history.

(56) References Cited

U.S. PATENT DOCUMENTS

| | | | | |
|---|---|---|---|---|
| 4,175,867 A * | 11/1979 | Piazza | ..................... | B01F 5/246 |
| | | | | 366/337 |
| 4,715,722 A * | 12/1987 | Hergeth | ................. | D01G 13/00 |
| | | | | 366/132 |
| 5,285,930 A * | 2/1994 | Nielsen | ................... | B28C 5/404 |
| | | | | 177/121 |
| 5,316,197 A * | 5/1994 | Tobler | ..................... | B28C 5/404 |
| | | | | 118/308 |
| 5,470,145 A * | 11/1995 | Lopez | ..................... | B28C 5/404 |
| | | | | 366/102 |
| 5,480,256 A * | 1/1996 | Itsekson | .................. | E01C 19/47 |
| | | | | 366/18 |
| 5,599,095 A * | 2/1997 | Elkin | ..................... | B28C 5/404 |
| | | | | 366/154.1 |
| 6,550,362 B1 * | 4/2003 | Galinat | .................... | B26D 5/32 |
| | | | | 366/151.1 |
| 9,963,318 B1 * | 5/2018 | Robbins | ................ | B65H 43/06 |
| 2012/0192766 A1 * | 8/2012 | Ferraiolo | .................. | B28C 5/40 |
| | | | | 106/638 |

* cited by examiner

FIBER PRE-DISPERSING DEVICE FOR FIBER REINFORCED CONCRETE

TECHNICAL FIELD

This invention relates to the technical field of fiber dispersion, particularly related to fiber pre-dispersing device for fiber reinforced concrete.

BACKGROUND

Concrete is widely used in the field of civil engineering because of its high strength, stiffness, impact resistance, earthquake resistance and durability, as well as science and technology advances, the quality requirements of concrete are getting higher and higher. Engineering practice has proved that concrete has some defects such as low flexural and tensile strength, high brittleness and poor to ness, which severely limits its application in engineering.

Therefore, the common practice in engineering is to take corresponding measures to improve some structural properties of concrete itself For this purpose, people often nix reinforced fiber materials in the preparation of concrete materials to improve the brittleness and durability of concrete, arid this method has been gradually popularized and applied in practice. When the fiber reinforced concrete gets bent, the concrete matrix transmits the tensile stress to the interface, and the interface in turn transmits the force to the fibers randomly distributed in the concrete, then the fibers in the concrete realize the main bearing capacity, and the fibers can bear the larger tensile stress, hindering the crack propagation. A lot of studies have concluded that adding fiber can improve the flexural strength and toughness of concrete. However, if the fiber is not pre-dispersed before use, it could affect the dispersion effect in fracturing fluid, resulting in poor performance. Nowadays, the fibers are pre-dispersed manually, often leading to poor dispersion effect. Therefore, if the fiber dispersion effect cannot be improved, the use effect of fibers in concrete construction would be greatly reduced.

SUMMARY

In order to solve the problem described above, this invention provides a fiber pre-dispersing device for fiber reinforced concrete described as follows.

A fiber pre-dispersing device for fiber reinforced concrete, includes: a dispersing chamber, a feed inlet is installed on the upper side of the dispersing chamber, a hopper is installed in the feed inlet, a first dispersing device is installed in the dispersing chamber, a discharge outlet is installed at the bottom of the dispersing chamber, and connected with a second dispersing device, grooves are arranged on both sides of the dispersing chamber, supporting legs are installed in the grooves.

The first dispersing device includes a main shaft, both sides of the main shaft are connected with bearings, and the bearings are installed in the dispersing chamber, one side of the main shaft is connected with a first motor, a first motor is installed at one side of the dispersing chamber, the main shaft is connected with four dispersing rods, and the four dispersing rods are uniformly arranged on the main shaft with an included angle of 45 degrees, the other side of the dispersing rod is connected with a dispersing block, two sides of the main shaft are connected with a plurality of connecting frames, the connecting frames are uniformly arranged on the main shaft in a cross shape, and connecting rods connect the connecting frames on both sides, the connecting rods are sleeved with a roller, and the surface of the roller is connected with. a plurality of dispersing gears.

The second dispersing device includes a discharging box, oil cylinders are installed at both sides of the discharging box, the power output end of the oil cylinders is connected with a T-shaped push plate, and two sides of the T-shaped push plate are connected with slide plates, the discharging box is provided with a chute at the slide plate, the slide plate is slidably installed in the chute, bearing blocks are installed in the slide plates on both sides, and rotating rods are connected between the bearing blocks on both sides, both sides of the discharging box are provided with adjusting grooves, the rotating rod is slidably installed in the adjusting grooves, and a second motor is installed on both sides of the sliding plates, and the power output end of a second motor is connected with the rotating rod, the rotating rods on both sides are connected with a grinding cylinder, the surface of the grinding cylinder is connected with a plurality of grinding gears, and the grinding gears on both sides are arranged crosswise.

Further, the bottom of the supporting leg is provided with anti-slip shading in a wavy structure, which can provide better support to the device.

Further, a check valve is installed on the top of the discharge box, which can control the flow of discharge.

Further, the outer sides of a first motor and a second motor are sleeved with protective sleeves, which can offer protection to a first motor and a second motor.

Further, stiffeners are welded at the joint of the T-shaped push plate and the slide plates on both sides. This structural design strengthens the connection effect between the T-shaped push plate and the slide plates on both sides.

Further, the upper and lower sides of the chute are provided with guide grooves, guide rods are installed in the guide grooves, the guide rods are connected with guide blocks in a sliding way, and the guide blocks are fixedly installed on the slide plates. This structural design makes the slide plates more stable during moving.

Further, folding baffles are connected between the slide plates on both sides. This structural design is convenient for shielding the adjusting groove.

Further, the dispersing gears are arranged in a conical structure. This structural design improves the predispersion effect.

A fiber dispersion-improving method based on the fiber pre-dispersing device for fiber reinforced concrete includes the following steps:

S1, putting fiber raw materials to be dispersed into a hopper, wherein the materials enter the dispersing chamber through the hopper;

S2, starting a first dispersing device, wherein dispersing blocks and dispersing gears matched with rollers preliminarily disperse and stir the fiber raw materials described in S1 in the dispersing device; the degree of dispersing fiber raw materials can be adjusted by controlling the rotation speed of a first motor;

S3, opening the check valve to make the pre-dispersed fiber materials fall into a second dispersing device after the fibers are pre-dispersed in S2, wherein a first dispersing device keeps rotating, which can effectively prevent the entrance from being blocked; and S4, starting a second dispersing device to disperse the pre-dispersed fiber raw materials again, wherein oil cylinders on both sides can push the respective grinding cylinders for adjustment, in order to control the fineness of fiber raw material dispersion, achieving an improved dispersion; effect.

The beneficial effects of this invention are described as follows:

According to the invention, a first dispersing device and a second dispersing device are arranged in the device,-the dispersing blocks, and dispersing gears matched with rollers preliminarily disperse and stir the fiber raw materials in the dispersing device, starting a second dispersing device to disperse the pre-dispersed fiber raw materials again, oil cylinders on both sides can push the respective grinding cylinders for adjustment, in order to control the fineness of fiber raw material dispersion, thus achieving an improved dispersion effect.

Figure 1:
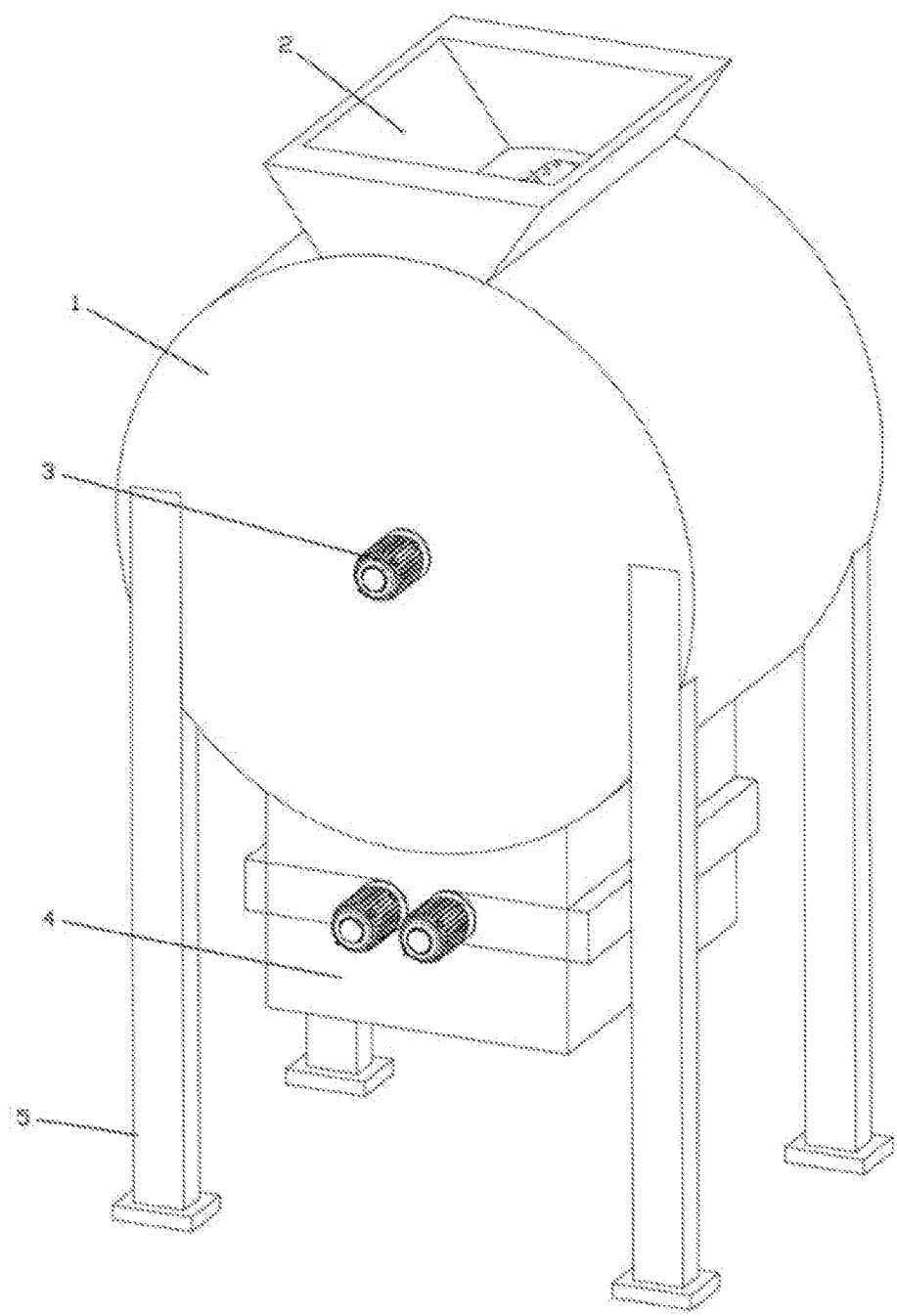
FIG. 1 is a structural schematic diagram of a fiber pre-dispersing device for fiber reinforced concrete according to an embodiment of the present invention.

Description of reference numerals in the drawings:

dispersing chamber 1, hopper 2, a first dispersing device 3, a second dispersing device 4, supporting stand foot 5, main shaft 6, bearing 7, a first motor 8, dispersing rod 9, dispersing block 10, connecting frame 11, connecting rod 12, roller 13, dispersing gear 14, discharging box 15, oil cylinder 16, T-shaped push plate 17, slide plate 18, bearing block 19, rotating rod 20, adjusting groove 21, a second motor 22, grinding cylinder 23, grinding gear 24, check valve 25, stiffener 26, guide rod 27, guide block 28, folding baffle 29.

DETAILED DESCRIPTION OF EMBODIMENTS

In order to enable those skilled in the art to better understand the present invention, the technical scheme of the present invention will be further explained below with reference to the figures and embodiments.

Figure 2:
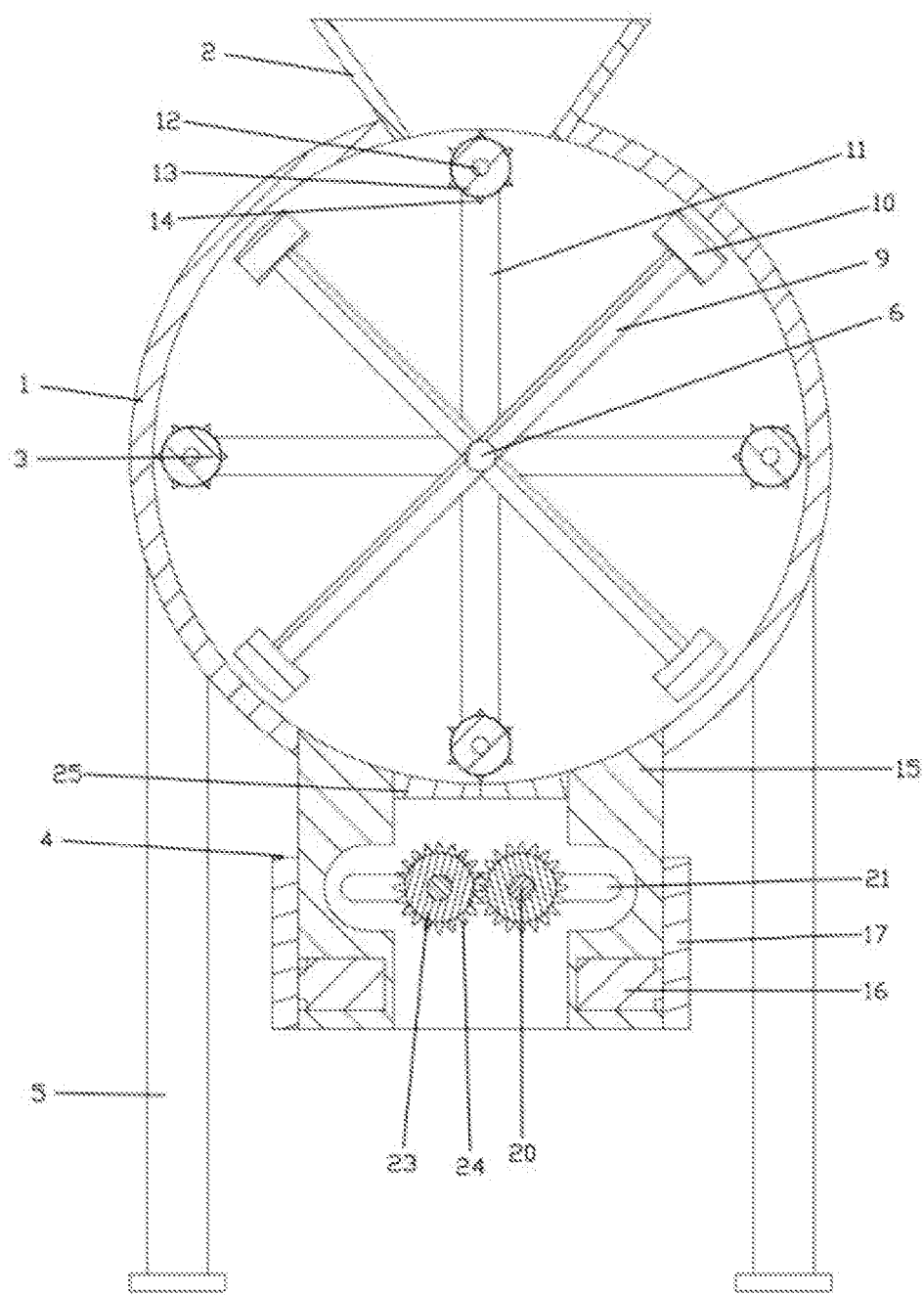
FIG. 2 is a schematic cross-sectional structure of a fiber pre-dispersing device for fiber reinforced concrete according to an embodiment of the present invention.
Figure 3:
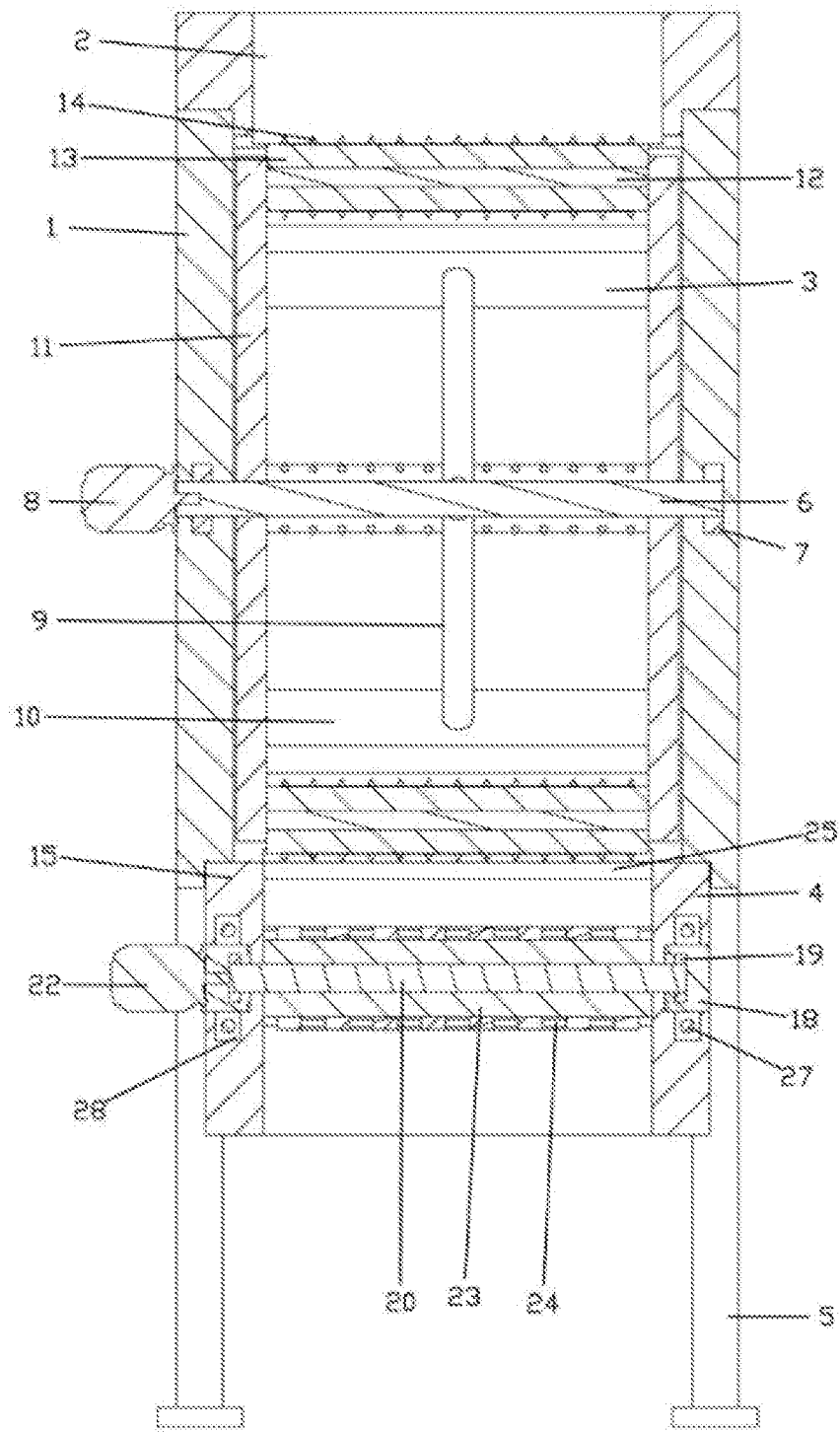
FIG. 3 is a vertical sectional structure diagram of a fiber pre-dispersing device for fiber reinforced concrete according to the embodiment of the invention.
Figure 4:
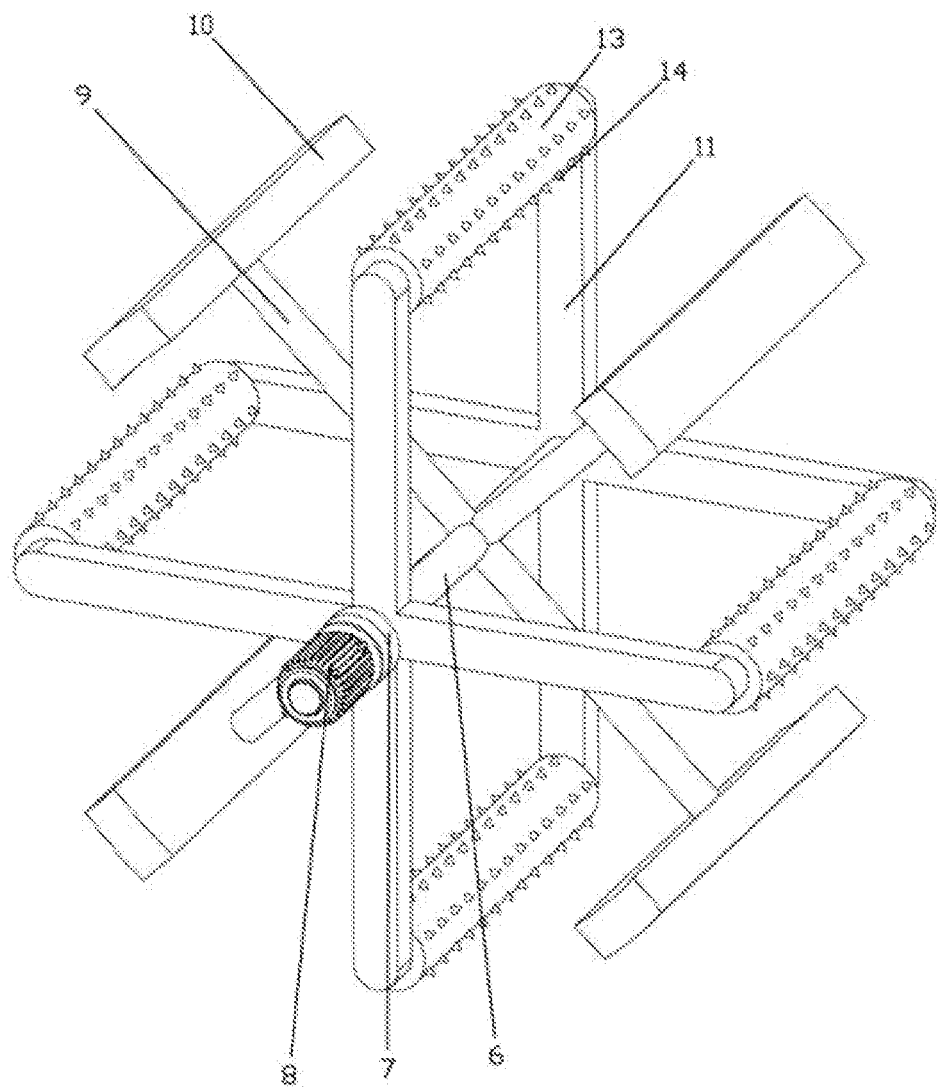
FIG. 4 is a structural diagram of a first dispersing device of a fiber pre-dispersing device for fiber reinforced concrete according to an embodiment of the present invention.
Figure 5:
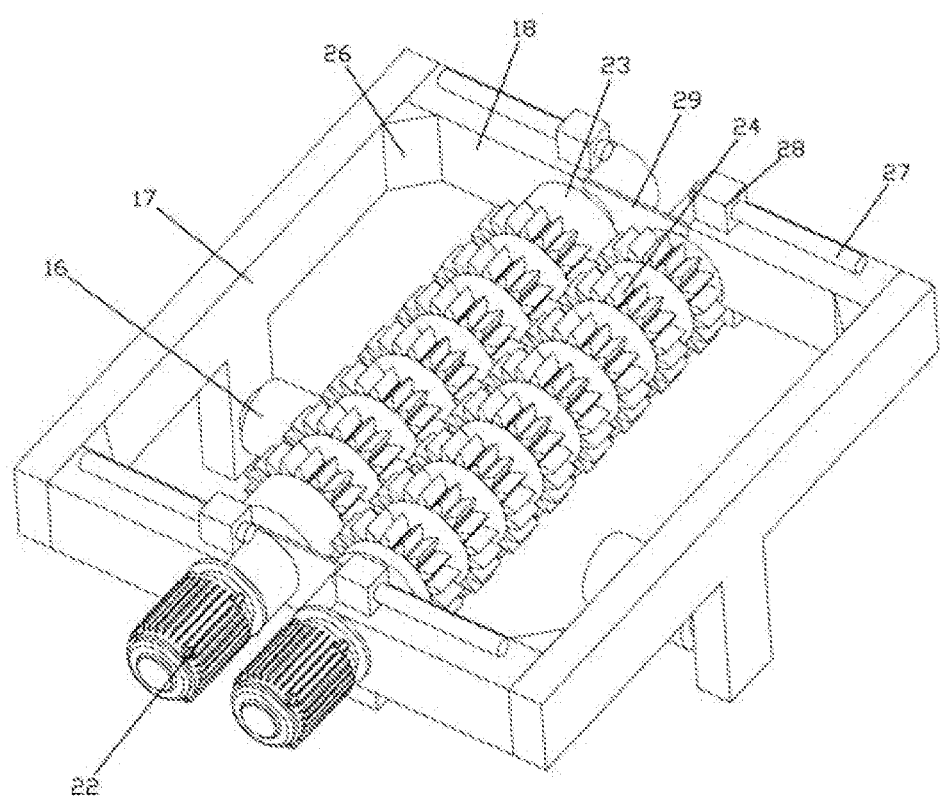
FIG. 5 is a structural diagram of a second dispersing device of a fiber pre-dispersing device for fiber reinforced concrete according to an embodiment of the present invention.

As shown in FIGS. 1-5, a feed inlet is installed on the upper side of the dispersing chamber 1, a hopper 2 is installed in the feed inlet, a first dispersing device 3 is installed in the dispersing chamber 1, a discharge outlet is installed at the bottom of the dispersing chamber 1, and connected with a second dispersing device 4, and grooves are arranged on both sides of the dispersing chamber 1, supporting legs 5 are installed in the grooves.

The first dispersing device 3 includes a main shaft 6, both sides of the main shaft 6 are connected with bearings 7, and the bearings 7 are installed in the dispersing chamber 1, one side of the main shaft 6 is connected with a first motor 8, the first motor 8 is installed at one side of the dispersing chamber 1, the main shaft 6 is connected with four dispersing rods 9, and the four dispersing rods 9 are uniformly arranged on the main shaft 6 with an included angle of 45 degrees, the other side of the dispersing rod 9 is connected with a dispersing block 10, two sides of the main shaft 6 are connected with a plurality of connecting frames 11, the connecting frames 11 are uniformly arranged on the main shaft 6 in a cross shape, and connecting rods 12 connect the connecting frames 11 on both sides, the connecting rod 12 is sleeved with a roller 13, and the surface of the roller 13 is connected with a plurality of dispersing gears 14.

The second dispersing device 4 includes a discharging box 15, oil cylinders 16 are installed at both sides of the discharging box 15, the power output end of the oil cylinder 16 is connected with a T-shaped push plate 17, and two sides of the T-shaped push plate 17 are connected with slide plates 18, the discharging box 15 is provided with a chute at the slide plate 18, the slide plate 18 is slidably installed in the chute, bearing blocks 19 are installed in the slide plates 18 on both sides, and rotating rods 20 connect the bearing blocks 19 on both sides, two sides of the discharging box 15 are provided with adjusting grooves 21, the rotating rod 20 is slidably installed in the adjusting grooves 21, and a second motor 22 is installed on each of the both side of the sliding plates 18, and the power output end of a second motor 22 is connected with the rotating rod 20, the rotating rods 20 on both sides are connected with a grinding cylinder 23, the surface of the grinding cylinder 23 is connected with a plurality of grinding gears 24, and the grinding gears 24 on both sides are arranged crosswise.

Preferably, e bottom of the supporting leg 5 is provided with anti-slip shading in a wavy structure. This structural design makes the support more stable, In practice, other structural shapes of the supporting legs 5 can also be considered according to specific conditions.

Preferably, the top of the discharge box 15 is provided with a check valve 25. Such a structural design can control the flow of discharge. In practice, other structural shapes of the check valve 25 can also be considered according to the specific situation.

Preferably, the outer ides of a first motor 8 and a second motor 22 are sleeved with protective sleeves. In practice, other protective structure shapes of a first motor 8 and a second motor 22 can also be considered according to specific conditions.

Preferably, stiffeners 26 are welded at the joint of the T-shaped push plate 17 and the slide plates 18 on both sides. This structural design enhances the connection effect between the T-shaped push plate 17 and the slide plates 18 on both sides. In practice, other connecting structure shapes of the T-shaped push plate 17 and the slide plates 18 on both sides can also be considered according to specific conditions.

Preferably, the upper and lower sides of the chute are provided with guide grooves, guide rods 27 are installed in the guide grooves, the guide rods 27 are connected with guide blocks 28 in a sliding way, and the guide blocks 28 are fixedly installed on the slide plates 18. This structural design makes the sliding plate 18 more stable when moving. In practice, other guiding and sliding structure shapes of the dispersing box 1 and the slide plate 18 can also be considered according to specific conditions.

Preferably, folding baffles 29 are connected between the slide plates 18 on both sides. This structural design is convenient to shield the adjusting groove 21. In practice, other structural shapes of the folding baffle 29 can also be considered according to specific conditions.

Preferably, a plurality of dispersing gears 14 are distributed on the surface of the roller 13 at equal intervals. In practice, other arrangement and installation structure shapes of the dispersing gears 14 can also be considered according to specific conditions.

Preferably, a plurality of dispersing gears 14 are distributed on the surface of the roller 13 at equal intervals. This structural design makes the dispersion effect better. In practice, other arrangement and installation structure shapes of the dispersing gears 14 can also be considered according to specific conditions.

Preferably, the dispersing gears 14 are arranged in a conical structure. In practice, other structural shapes of the dispersing gears 14 can also be considered according to specific conditions.

A fiber dispersion-improving method based on the fiber pre-dispersing device for fiber reinforced concrete includes the following steps:

S1, putting fiber raw materials to be dispersed into a hopper 2, wherein the materials enter the dispersing chamber 1 through the hopper 2;

S2, starting a first dispersing device 3, wherein dispersing blocks 10 and dispersing gears 14 matched with rollers 13 preliminarily disperse and stir the fiber raw materials described in Si in the dispersing device 3; the degree of dispersing fiber raw materials can be adjusted by controlling the rotation speed of a first motor 8;

S3, opening the check valve 25 to make the pre-dispersed fiber materials fall into a second dispersing device 4 after the fibers are pre-dispersed in S2, meanwhile, wherein a first dispersing device 3 keeps rotating, which can effectively prevent the entrance from being blocked; and S4, starting a second dispersing device 4 to disperse the pre-dispersed fiber raw materials again, wherein oil cylinders 16 on both sides can push the respective grinding cylinders 23 for adjustment, in order to control the fineness of fiber raw material dispersion, achieving an unproved dispersion effect.

In this embodiment, the fiber raw materials to be dispersed are put into hopper 2 and a first motor 8 is started, so that a first motor 8 drives the main shaft 6 to rotate, and the main shaft 6 drives the dispersing rod 9 and the connecting frame 11 to rotate, and the dispersing rod 9 drives the dispersing block 10 to disperse the fiber raw materials, while the connecting frame 11 drives the connecting rod 12 and drives the roller 13, the roller 13 drives the dispersing gear 14 to disperse the fiber raw materials, and the effect of pre-dispersing the fiber raw materials is realized. After pre-dispersing by a first dispersing device 3, the fiber raw materials enter a second dispersing device 4, next, starting a second motor 22 on both sides, a second motor 22 on both sides drives the rotating rod 20, which drives the grinding cylinder 23, which drives the grinding gear 24 to disperse the dropped fiber raw materials, controlling the oil cylinders 16 on both sides to push the T-shaped push plate 17, and the T-shaped push plate 17 moves outwards and drives the slide plates 18 on both sides, so that the slide plates 18 drive the rotating rod 20 to slide along the adjusting groove 21, and the adjustment of the distance between the two grinding cylinders 23 is realized, thus controlling the dispersion effect of fiber raw materials, and dispersing fiber raw materials according to different requirements.

The above examples only illustrate the principle and efficacy of the present invention and are not intended to limit the present invention. Anyone skilled in the art can modify or adjust the above embodiments without departing from the spirit and scope of the present invention. Therefore, all equivalent modifications or changes made by those with ordinary knowledge in the technical field without departing from the spirit and technical idea disclosed by the present invention should still be covered by the claims of the present invention.

What is claimed is:

1. A fiber pre-dispersing device for fiber reinforced concrete, comprising: a dispersing chamber (1), wherein a feed inlet is installed on an upper side of the dispersing chamber (1), a hopper (2) is installed in the feed inlet, a first dispersing device (3) is installed in the dispersing chamber (1), a discharge outlet is installed at a bottom of the dispersing chamber (1) and connected with a second dispersing device (4), grooves are arranged on two sides of the dispersing chamber (1), and supporting legs (5) are installed in the grooves;

wherein the first dispersing device (3) comprises a main shaft (6), both two sides of the main shaft (6) are connected with bearings (7), and the bearings (7) are installed in the dispersing chamber (1), an end of the main shaft (6) is connected with a first motor (8), the first motor (8) is installed at a side of the dispersing chamber (1), the main shaft (6) is connected with four dispersing rods (9), and the four dispersing rods (9) are uniformly arranged on the main shaft (6) with an included angle of 45 degrees, an end of each of the four dispersing rods (9) is connected with a dispersing block (10), the two sides of the main shaft (6) are connected with a plurality of connecting frames (11), the plurality of connecting frames (11) are arranged at the two sides of the main shaft (6) in a cross shape, connecting rods (12) are connected between corresponding two of the plurality of connecting frames (11), the connecting rod (12) is sleeved with a roller (13), and a surface of the roller (13) is connected with a plurality of dispersing gears (14); and wherein the second dispersing device (4) comprises a discharging box (15), oil cylinders (16) are installed on two sides of the discharging box (15) respectively, power output ends of the oil cylinders (16) are connected with T-shaped push plates (17) respectively, two sides of each of the T-shaped push plates (17) are connected with slide plates (18), the discharging box (15) is provided with chutes (18), the slide plates (18) are slidably installed in the chutes, bearing blocks (19) are installed in the slide plates (18) respectively, rotating rods (20) are connected with the bearing blocks (19), two sides of the discharging box (15) are provided with adjusting grooves (21), the rotating rods (20) are slidably installed in the adjusting grooves (21), second motors (22) are installed on two sides of two of the slide plates (18) respectively, power output ends of the second motors (22) are connected with the rotating rods (20) respectively, each of the rotating rods (20) is connected with a grinding cylinder (23), a surface of the grinding cylinder (23) is connected with grinding gears (24), and the grinding gears (24) are arranged crosswise.

2. The fiber pre-dispersing device for fiber reinforced concrete as claimed in claim 1, wherein a bottom of each of the supporting legs (5) is provided with an anti-slip surface comprising a wavy structure.

3. The fiber pre-dispersing device for fiber reinforced concrete as claimed in claim 2, wherein a check valve (25) is installed on a top of the discharge box (15).

4. The fiber pre-dispersing device for fiber reinforced concrete as claimed in claim 3, wherein outer sides of the first motor (8) and second motors (22) are sleeved with protective sleeves respectively.

5. The fiber pre-dispersing device for fiber reinforced concrete as claimed in claim 4, wherein stiffeners (26) are respectively welded at joints of the T-shaped push plates (17) and the slide plates (18) on both sides.

6. The fiber pre-dispersing device for fiber reinforced concrete as claimed in claim 5, wherein upper and lower sides of the chute are provided with guide grooves, guide rods (27) are installed in the guide grooves, the guide rods (27) are connected with guide blocks (28) in a sliding way, and the guide blocks (28) are fixedly installed on the slide plates (18).

7. The fiber pre-dispersing device for fiber reinforced concrete as claimed in claim 6, wherein folding baffles (29) are connected between the slide plates (18).

8. The fiber pre-dispersing device for fiber reinforced concrete as claimed in claim 7, wherein the plurality of dispersing gears (14) are distributed on the surface of the roller (13) at equal intervals.

9. The fiber pre-dispersing device for fiber reinforced concrete as claimed in claim 8, wherein each of the dispersing gears (14) arc arranged in comprises a conical structure.

10. A fiber dispersion improving method based on the fiber pre- dispersing device for fiber reinforced concrete as claimed in claim 1, comprising the following steps:

S1, putting fiber raw materials to be dispersed into the hopper (2), wherein the fiber raw materials enter the dispersing chamber (1) through the hopper (2);

S2, starting the first dispersing device (3), wherein dispersing blocks (10) and dispersing gears (14) matched with each roller (13) preliminarily disperse and stir the fiber raw materials described in S1 in the dispersing device (3); and the first motor (8) is configured to adjust a process of dispersing the fiber raw materials by controlling a rotation speed thereof;

S3, opening a check valve (25) to make the pre-dispersed fiber materials fall into the second dispersing device (4) after the fibers fiber raw materials are pre-dispersed in S2, wherein the first dispersing device (3) keeps rotating to prevent an entrance of the check valve (25) from being blocked;

S4, starting the second dispersing device (4) to disperse the pre-dispersed fiber raw materials again, wherein the oil cylinders (16) are configured to push the respective grinding cylinders (23) for adjusting a fineness of fiber raw material.

* * * * *